Aug. 7, 1962  A. Y. DODGE  3,048,057
TRANSMISSION
Filed Oct. 26, 1959  2 Sheets-Sheet 1
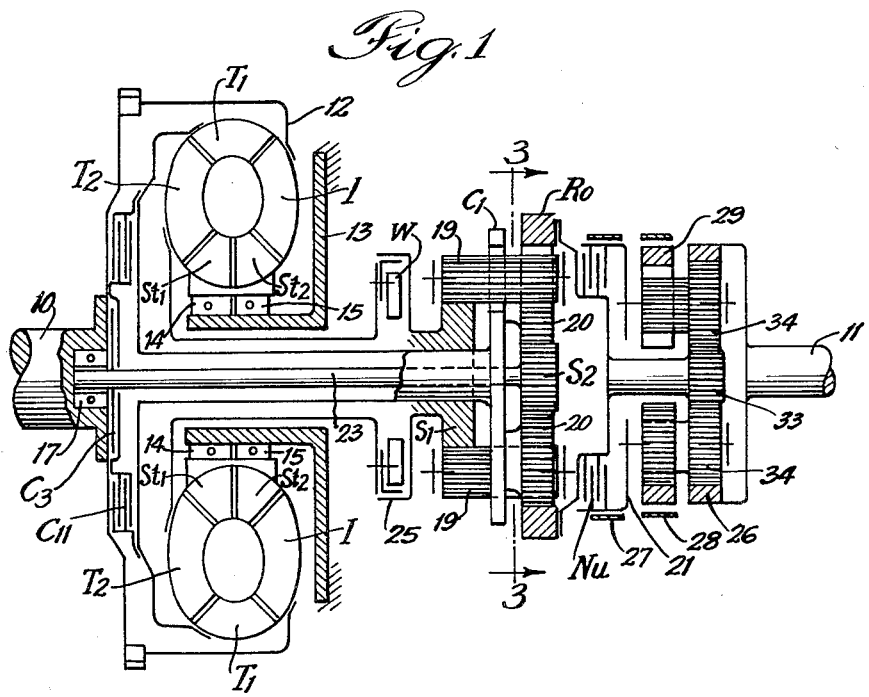
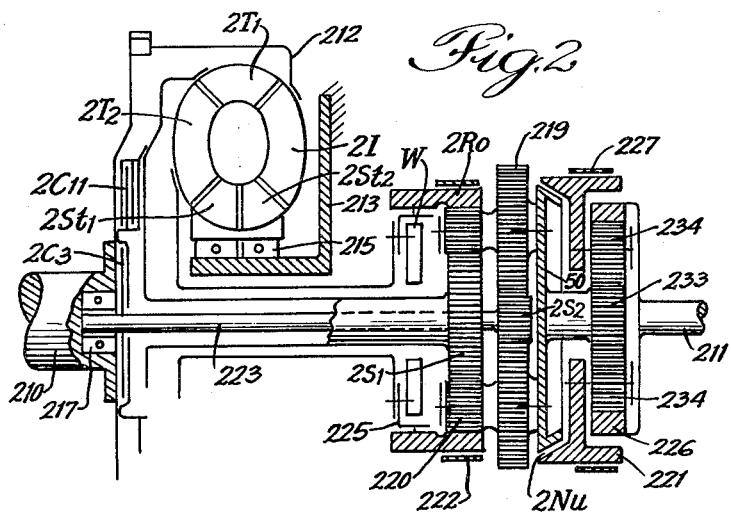
INVENTOR:
Adiel Y. Dodge,
BY
Bair Freeman & Molinare
ATTORNEYS.

Aug. 7, 1962  A. Y. DODGE  3,048,057
TRANSMISSION
Filed Oct. 26, 1959  2 Sheets-Sheet 2
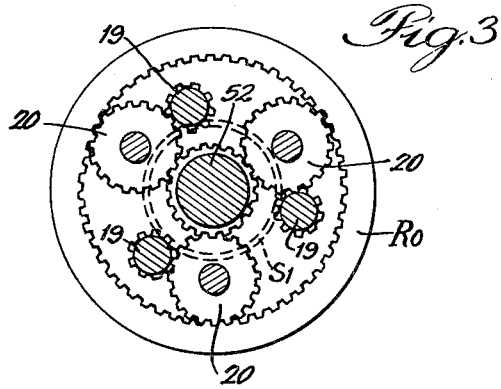
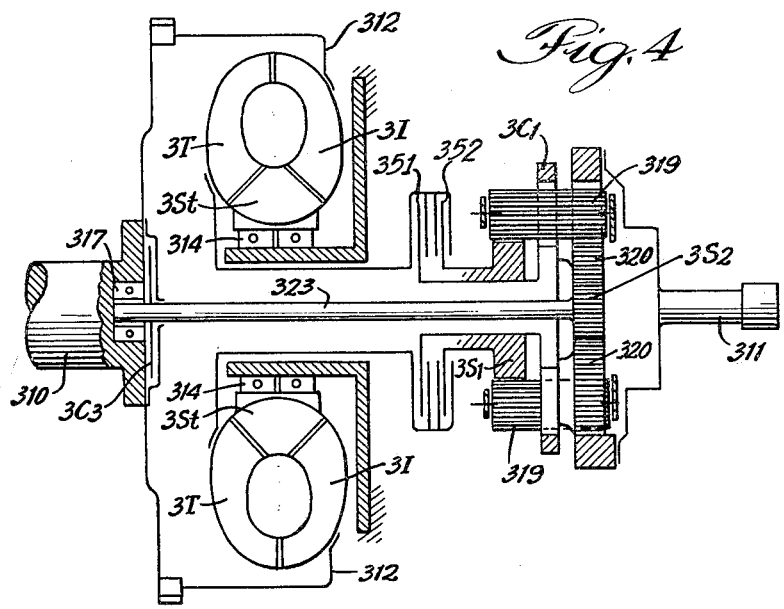
INVENTOR:
Adiel Y. Dodge,
BY
Bair, Freeman & Molinare
ATTORNEYS.

3,048,057
TRANSMISSION
Adiel Y. Dodge, % A. Y. Dodge Co., 206 S. Main St., Rockford, Ill.
Filed Oct. 26, 1959, Ser. No. 848,780
6 Claims. (Cl. 74—677)

This invention relates to transmissions and more particularly to a combined hydrokinetic torque converter and gear transmission of a type suitable for use in automotive vehicles.

One object of the invention is to provide a transmission in which the torque is transmitted through a regenerative power circuit at low speeds, through a direct hydraulic circuit at intermediate speeds and through two simultaneous parallel paths of power flow at high speeds.

Another object is to provide a transmission having the advantages and features set forth in my Patent No. 2,334,394 in which the planetary gearing provides a regenerative or recirculating system of power flow at the start and two separate paths of simultaneous power flow above some optimum point. These features increase the efficiency and extent of the useful range. In this case, the change from regenerative to non-regenerative circuit occurs automatically due to fluid action in the torque converter without the necessity of shifting a friction brake or clutch.

Another object of this transmission is to provide a twin turbine torque converter having a first and second turbine and means through differential gearing to hook the first turbine to the driven shaft via a recirculating or regenerative circuit so that the starting torque may be increased over and above the torque ratio provided by the hydrokinetic torque converter alone.

Another object of this invention is to provide a transmission in which the important shift is made through the action of the hydraulic fluid in the hydrokinetic fluid drive. This shift is inherently automatic and extremely smooth. After a certain torque speed ratio has been attained, the increased torque available in the second turbine manifests itself through my special gear arrangement so that the two turbines become connected opposedly and differentially to provide two simultaneous hydraulic paths of power flow to drive the driven shaft. Their joint action automatically and inherently supersedes the regenerative action prevalent at the start.

Another object is to provide the necessary gear and friction clutch so that finally the transmission will operate in a high efficiency range wherein a fraction of the power is transmitted mechanically and differentially opposing the power and torque being transmitted jointly by the turbines.

The above and other objects and features of this invention will be more readily apparent from the following description when read in connection with the accompanying drawings, in which:

FIGURE 1 diagrammatically shows an axial section with parts in elevation of a transmission embodying the invention;

FIGURE 2 diagrammatically illustrates an axial section of an alternative construction of a transmission embodying the invention;

FIGURE 3 is a partial section on the line 3—3 of FIGURE 1; and

FIGURE 4 is a view similar to FIGURE 1 of a further alternative construction.

The transmission shown in FIGURE 1 is adapted to connect a driving shaft 10 which may be an engine crank shaft or an extension thereof to a driven shaft 11 which may be connected to the usual differential to drive the wheels of a vehicle. The driving shaft 10 drives a hydraulic torque converter indicated generally at 12 which drives through a chain of differential gears.

The torque converter 12 is comprised of an impeller I, first turbine T1, a second turbine T2, and a pair of stator wheels $St_1$ and $St_2$. Said stators are connected to a fixed member 13 in the usual manner by means of one way brakes 14 and 15. The turbine wheels T1 and T2 are connected to the driven shaft 11 through a special arrangement of planetary differential gears.

As shown in FIGURE 1, the special arrangement of differential gearing comprises a ring gear RO meshing with planetary gears 20 carried by a carrier or cage C1 and which in turn mesh with a sun gear S2. Elongated planet pinions carried by the carrier C1 mesh with the pinions 20 and with a sun gear S1, as best seen in FIGURES 1 and 3. The sun gear S1 is connected to the driven member of a centrifugal clutch 25 which is normally disengaged and which engages at a predetermined speed. The driving member of the clutch 25 is connected to the turbine wheel T2 so that the clutch will engage in response to a predetermined speed of the turbine wheel. The clutch 25 may preferably be of a type having a shortened slip period, such as the clutch more particularly disclosed and claimed in my patents, Reissue No. 22,682 and No. 2,398,885.

The ring gear RO constitutes the output member of the gear set and is connected to a sun gear 33 of a secondary gear set. The sun gear 33 meshes with planet pinions 34 carried by a carrier 21 and which in turn mesh with a ring gear 26. The ring gear 26 is connected to the output shaft 11. A clutch NU may connect the ring gear RO directly to the carrier 21 to lock out the secondary gear set. For reverse drive, the carrier 21 may be held stationary by a brake 27 and for low speed, high torque forward drive a brake 28 may hold a ring gear 29 meshing with extensions of the planet pinions 34.

The sun gear S2 mounted on the shaft 23 is connected to the input shaft 10 through a one way clutch 17 which will prevent the sun gear S2 from overrunning the input shaft 10 in a forward direction, but will permit the input shaft to overrun the sun gear. For a two-path hydraulic and mechanical drive, as described hereinafter, the sun gear S2 may be connected mechanically to the input shaft through a friction clutch C3 or alternatively the cage C1 may be connected to the input shaft through a friction clutch C11 to provide a different two-path mechanical and hydraulic combination.

The turbine wheel T1 drives the cage C1 at the start. Planet gears 19 and 20 react to drive ring gear RO and sun gear S2 in a forwardly direction. This action tends to drive sun gear S2 forwardly and forms a feed back to help drive the input shaft 10 in a forwardly direction through one way clutch 17. In this way, T1 at the start is connected regeneratively to the output shaft through the differential gears in a manner to provide a feed back or recirculating system sometimes called a regenerative system thereby to permit or cause the torque converter elements (including the engine) to turn at an increased speed thereby to deliver an increased torque and an increased torque ratio in accordance with the laws now well established for regenerative gear hookups.

Initially, turbine T2 and sun gear S1 are free because clutch 25 is disengaged. As the vehicle gets under way and T1 increases in speed, the fluid acting upon T2 increases in the torque action thereof until a point is reached when T2 is able to turn sun gear S1.

When the speed of T2 has increased to some predetermined point, centrifugal clutch 25 will be caused to engage by centrifugal force so that T2 drives sun gear S1. It will be seen by the gear arrangement that sun gear S1 and cage C1 are differentially opposedly connected to form two separate simultaneous paths of hydraulic power flow balancing turbine T1 against turbine T2 torquewise to drive ring gear RO and output shaft 11 through the neutral clutch NU. Sun gear S1 and cage C1 take over the action of driving the ring gear RO. The feed back tendency to drive sun gear S2 forwardly diminishes and disappears permitting input shaft 10 to overrun sun gear shaft 23.

In the alternative construction shown in FIGURE 2, parts corresponding to like parts in FIGURE 1 are indicated by the same reference numerals with the prefix 2. This construction is the same as that of FIGURE 1 except for differences in the gear set. As shown in FIGURE 2, the sun gear S1 meshes with planet pinions 220 which in turn mesh with the ring gear 2RO. The sun gear 2S1 is connected to the trubine wheel 2T1. The ring gear 2RO is connected through the speed responsive clutch 225 to the turbine wheel 2T2. Planet pinions 219 connected as extensions of the pinions 220 mesh with the sun gear 2S2, which is connected to the input shaft 10 through the one way clutch 17 or the friction clutch 2C3, as in FIGURE 1.

The carrier for the pinions 219 and 220 terminates in a friction clutch element 50 which is in turn connected directly to the sun gear 233. The sun gear 233 meshes with pinions 234 which in turn mesh with the sun gear 226 connected to the output shaft 211. The pinions 234 are carried by a carrier 221 which may be held stationary by a brake 227 or which may engage the friction element 50. Similarly, the ring gear 2RO may be held stationary by a brake 222 for a purpose to be described hereinafter.

Clutches 25 and 225 are optional. These clutches preclude the action of the gears to turn turbine T2 in a reverse direction at low speeds. Since it is planned to have clutch 25 or 225 engaged somewhat prior to the time when turbine T2 picks up its load, it might be said that turbine T2 picks up its load hydraulically rather than mechanically.

In this way, I have introduced a hydraulic torque converter and a gear system to go therewith which starts out regeneratively and of its own accord through its hydraulic action and characteristics changes over to a non-regenerative two simultaneous hydraulic paths of power flow therein T1 is differentially balanced against T2 torquewise.

After intermediate speeds and torque loads have been surpassed and 1:1 torque ratios are being approached, the clutch C3 may be engaged to drive sun gear S2 after which there will be established a mechanical path directly from the driving shaft 10 to sun gear S2 which is differentially opposed to the torque action of S1 driven by turbine T2, thus to provide two simultaneous and separate paths of power flow—one path hydraulic and one path mechanical—providing higher efficiency in the 1:1 and also in the lower increased torque ranges.

This latter change requires the engagement of a friction clutch C3 but its engagement causes a fractional shift of something less than ⅓ of the entire power and torque being transmitted; therefore, the engagement or disengagement of clutch C3 is a fractional shift. It can be made at will in the proper ranges with great smoothness.

Under certain conditions, for a period of time, three paths of power flow exist. The two aforementioned hydraulic paths driving sun gears S1 and S2 plus the mechanical described elsewhere.

For reverse drive in both figures, ring gear 26 is the output member and brake 27 or 227 engaged to stall the cage 21 or 221 to cause ring gear 26 or 226 and driven shaft 11 or 211 to turn in the reverse direction.

In this way I have produced a transmission having a wide torque range and a widened efficiency range. I have done this without resorting to additional reactionary members over and above the hydraulic stator except for reverse. In this transmission, the shift from regenerative circuit to two-path hydraulic drive occurs inherently without external control means due to the hydraulic action which takes place inside of the hydraulic torque converter. Further I have produced a transmission which may be shifted into a still higher efficiency range by engagement of a friction clutch transmitting less than ⅓ of the horsepower.

*FIGURE 1—In Operation: First Stage Engine Idling.—* Little torque is generated. Friction clutch NU may be disengaged. Second stage, engage neutral clutch NU if disengaged. Increase speed of engine. Turbine T1 is first to generate torque. It turns cage C1 which imposes a forwardly acting tooth load on sun gear S2 and on ring RO. The resulting torque load on S2 is returned to the source of power (or engine) thus producing a feed back or a regenerative circuit. Third stage, as speed is increased, T2 generates more and more torque until it finally turns S1. During this stage, there exists two simultaneous hydraulic paths of power flow; T1 and T2 which are now differentially opposed to each other to jointly drive the output ring gear RO. This stage continues until a medium high output speed or low output torque or a combination of the two is attained after which ultimately the fourth stage of drive may be entered into by engaging either friction clutch C3 or C11, thereby establishing a simultaneous mechanical path of power flow to oppose the hydraulic path through T2 thus to provide two simultaneous non-regenerative paths of power flow. If clutch C3 is engaged to drive S2, a small percentage of power is mechanically transmitted (such as approximately 23% as shown). But if clutch C11 is engaged to mechanically drive the cage, then a major percentage of the power is mechanically transmitted through the cage differentially. The hydraulic power transmitted through S2 is in an opposed manner to form two simultaneous paths of non-regenerative power flow.

*FIGURE 2: In Operation.—*The operation of the transmission shown in FIGURE 2 is very similar to that of FIGURE 1 except that turbine T1 drives sun gear S1 instead of the cage and turbine T2 drives the ring gear R1 instead of sun gear S2. Sun gears S2 function in similar manner in both cases. The general results are very similar in both cases.

The foregoing is all predicated on clutch NU being engaged for forward drive. For reverse drive, clutch NU is disengaged and brake 227 is engaged to stall cage 221 thereby to turn ring gear 226 in a reverse direction due to the action of sun gear 233 acting through planets 234. With this arrangement, all of the various torque ratios available for forward drive are also available for reverse drive modified by the mechanical advantage of the reverse gears during reverse.

In FIGURE 2, I have provided a brake 222 to hold ring gear R1 against reverse movement when desired. This provides an additional reaction element to absorb the reaction due to the increased torque. This brake is optional. It preferably is of a one way type, self-releasing due to forwardly acting torque loads, thus to automatically synchronize with clutch 225.

It will be seen that most of the advantages and novel features present in the arrangement shown in FIGURE 1 are also present in FIGURE 2 arrived at by somewhat different gear arrangements.

In the alternative arrangement shown in FIGURE 3, the torque converter has only a single turbine wheel 3T and a single stator 3St in place of the double turbine wheel, double stator constructions shown in FIGURES 1 and 2. In this construction, the gear set is substantially similar to that shown in FIGURE 1 and parts thereof corresponding to like parts in FIGURE 1 are indicated by the same reference numerals with the prefix 3. It will be seen that in this gear set the sun gear 3S2 is connected to the input shaft 310 through a one way clutch 317 or through a friction clutch 3C3 in the same manner as in FIGURE 1.

The turbine wheel 3T is adapted to be connected selectively or simultaneously to the sun gear 3S1 and/or a carrier 3C1 through clutches 351 and 352. The clutches 351 and 352 may be operated simultaneously or selectively through any desired type of clutch operating mechanism such, for example, as hydraulic clutch actuators.

The ring gear 3RO is shown connected directly to the output shaft 311.

For initial start under high torque loads, the clutch 3C3 is disengaged, the clutch 351 is disengaged and the clutch 352 is engaged. At this time, the turbine wheel 3T will drive the carrier 3C1 forward and through the planet pinions 320, the carrier will tend to turn both the ring gear 3RO and the sun gear 3S2 forward. The sun gear 3S2 will be connected to the input shaft through the one way clutch 317 to produce a high torque regenerative drive, as described above in connection with FIGURE 1.

After the speed has been built up and the torque load is decreased a direct hydraulic drive condition can be achieved by engaging the clutch 352 while the clutch 351 remains engaged. With both clutches engaged, the differential gear set is locked up to turn as a unit so that the torque of the turbine wheel 3T is transmitted directly at a 1:1 ratio to the output shaft 311.

For still higher speed and lower torque conditions at maximum efficiency, a two-path non-regenerative mechanical and hydraulic hook-up may be achieved by disengaging the clutch 351 and engaging the clutch 3C3. At this time, the input shaft 310 drives the sun gear 3S2 directly and mechanically while the turbine 3T drives the sun gear 3S1 hydraulically through the clutch 3S2. The torques on the sun gears 3S1 and 3S2 are combined through the gear set in a non-regenerative manner to produce a two-path non-regenerative combined mechanical and hydraulic drive similar to that described above in connection with FIGURE 1.

While three embodiments of the invention have been shown and described in detail, it will be understood that these are illustrative only and are not to be taken as a definition of the scope of the invention, reference being had for this purpose to the appended claims.

What is claimed is:

1. A transmission comprising a hydraulic torque converter having driving means, driven means and reaction means, a differential gear set including four relatively rotatable elements interconnected by gearing, means to connect a load to be driven to a first of said elements, means to connect the torque converter driving means to a source of power to be driven therefrom, clutch means to connect the source of power to a second element of the gear set, and means to connect the remaining two elements of the gear set to the torque converter driven means to be driven thereby, the gearing being so constructed and arranged that one of said remaining two elements acts therethrough with one of said remaining two elements is connected to the driven means and said clutch means is engaged to drive said first and second elements in a forward direction to produce a regenerative drive and when both of said remaining two elements are connected to the driven means said two remaining elements act through the gearing when said clutch means is disengaged to produce a hydraulic drive and when said clutch means is engaged to produce a two-path mechanical and hydraulic non-regenerative drive, the clutch means including a one-way clutch to prevent the second element from overrunning the source of power in a forward direction and a controllable clutch to drive the second element in a forward direction from the source of power.

2. A transmission comprising a hydraulic torque converter having an impeller, two turbines and a stator in sequence in a hydraulic path, a differential gear set including four relatively rotatable elements interconnected by gearing, means connecting a first of the elements to a load, clutch means to connect a second of the elements to the impeller, means connecting the third element to the first turbine, a clutch to connect the fourth element to the second turbine, the third element acting through the gearing to turn both the first and second element forward in a regenerative drive when the clutch means is effective and the clutch is disengaged to make the fourth element ineffective as a driving element, the third and fourth elements cooperating to drive the first element forward through two non-regenerative hydraulic paths when the clutch means is ineffective, and through non-regenerative parallel mechanical and hydraulic paths when the clutch means is ineffective and the clutch is engaged to drive the fourth element.

3. A transmission comprising a hydraulic torque converter having an impeller and first and second turbines and a stator sequentially arranged in a hydraulic path with the impeller, a differential gear set including four relatively rotatable elements interconnected by gearing means to connect a first of the elements to a load, clutch means to connect a second element to the impeller, means connecting the first turbine to a third element of the gear set, and a clutch to connect the fourth element of the gear set to the second turbine, the third element tending to drive both the first and second element forward in a regenerative drive when the fourth element is disconnected from the second turbine, the third and fourth elements coacting to drive the first element forward through two non-regenerative hydraulic paths when the clutch is engaged and the clutch means is disengaged and through combined mechanical and hydraulic non-regenerative paths when both the clutch and the clutch means are engaged.

4. A transmission comprising a hydraulic torque converter having an impeller and two turbines and a stator in sequence in a hydraulic path, a differential gear set including four relatively rotatable elements interconnected by gearing, means connecting a first of the elements to a load, clutch means to connect a second of the elements to the impeller, means connecting the third and fourth elements to the first and second turbines respectively, the third element acting through the gearing to turn both the first and second element forward in a regenerative drive when the clutch means is effective and the fourth element is ineffective as a driving element, the third and fourth elements cooperating to drive the first element forward through two non-regenerative hydraulic paths when the clutch means is ineffective, and through non-regenerative parallel mechanical and hydraulic paths when the clutch means and the fourth element are both effective, the clutch means including a one-way clutch to prevent the second element from overrunning the impeller forwardly and a controllable clutch to drive the second element forward with the impeller.

5. A transmission comprising a hydraulic torque converter having a driving member and a driven member, a differential gear set including a ring gear connected to a load, two sun gears, a planet carrier, pinions on the carrier meshing with the ring gear and one sun gear, and pinions on the carrier meshing with the first named pinions and the second sun gear, clutch means to connect said one sun gear to the driving member, and a pair of clutches to connect the driven member to the carrier and the second sun gear respectively.

6. The transmission of claim 5 in which the clutch means includes a friction clutch and a one-way clutch to prevent said one sun gear from over-running the driving member.

References Cited in the file of this patent

UNITED STATES PATENTS

| | | |
|---|---|---|
| 2,196,585 | Gette | Apr. 9, 1940 |
| 2,532,897 | Dodge | Dec. 5, 1950 |
| 2,725,762 | Hettinger et al. | Dec. 6, 1955 |
| 2,860,526 | Dodge | Nov. 18, 1958 |
| 2,873,618 | De Lorean | Feb. 17, 1959 |
| 2,892,363 | Dodge | June 30, 1959 |
| 2,908,190 | Hause | Oct. 13, 1959 |